United States Patent
Abele et al.

(10) Patent No.: US 10,875,163 B2
(45) Date of Patent: Dec. 29, 2020

(54) TIGHTENING PARAMETER SERVER WITH SUBSCRIPTION UPDATES

(71) Applicant: Apex Brands, Inc., Apex, NC (US)

(72) Inventors: Markus Abele, Ellwangen (DE); Jonathan Reay Harris, Troy, MI (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/637,488

(22) PCT Filed: Jul. 19, 2018

(86) PCT No.: PCT/US2018/042826
§ 371 (c)(1),
(2) Date: Feb. 7, 2020

(87) PCT Pub. No.: WO2019/032260
PCT Pub. Date: Feb. 14, 2019

(65) Prior Publication Data
US 2020/0223037 A1  Jul. 16, 2020

Related U.S. Application Data

(60) Provisional application No. 62/541,966, filed on Aug. 7, 2017.

(51) Int. Cl.
B25B 23/147 (2006.01)
B25F 5/00 (2006.01)
H04L 29/08 (2006.01)

(52) U.S. Cl.
CPC .............. *B25B 23/147* (2013.01); *B25F 5/00* (2013.01); *H04L 67/125* (2013.01)

(58) Field of Classification Search
None
See application file for complete search history.

(56) References Cited

U.S. PATENT DOCUMENTS

2011/0093110 A1   4/2011 Stencel et al.

FOREIGN PATENT DOCUMENTS

| DE | 202006014606 U1 | 1/2007 |
| WO | 2004003695 A2 | 1/2004 |
| WO | 2016179271 A1 | 11/2016 |

OTHER PUBLICATIONS

International Seach Report and Written Opinion of international application No. PCT/US2018/042826 dated Oct. 31, 2018.
(Continued)

*Primary Examiner* — Ryan A Jarrett
(74) *Attorney, Agent, or Firm* — Burr & Forman, LLP (57) ABSTRACT

An update manager for a tightening parameter server may include processing circuitry. The tightening parameter server may be operably coupled to one or more tool controllers that are each operably coupled to respective power tools. The processing circuitry may be configured to receive a subscription request from a tool controller where the subscription request identifies an application to which the tool controller is to be subscribed to receive updates to the application automatically, record an identity of the tool controller in association with the application to build a database of applications and corresponding tool controllers subscribed to each of the applications, determine that a particular application has been updated, and, in response to determining that the particular application has been updated, provide an update to each tool controller subscribed to the particular application.

24 Claims, 6 Drawing Sheets

(56) References Cited

OTHER PUBLICATIONS

Second Written Opinion of international application No. PCT/US2018/042826 dated Jul. 22, 2019.

| Appl ID | Controller ID | Version/status | User ID |
|---|---|---|---|
| App name 1 | Controller 1 | App 1 version A | User 1 |
| App name 2 | Controller 1 | App 2 version B | User 2 |
| App name 3 | Controller 1 | App 3 version C | User 1 |
| App name 4 | Controller 1 | App 4 version D* | User 1 |
| App name 1 | Controller 2 | App 1 version A | User 2 |
| App name 4 | Controller 2 | App 4 version D | User 1 |
| ... | ... | ... | ... |

TIGHTENING PARAMETER SERVER WITH SUBSCRIPTION UPDATES

CROSS REFERENCE TO RELATED APPLICATION

This application claims priority to U.S. patent application No. 62/541,966 filed Aug. 7, 2017, the entire contents of which are hereby incorporated by reference in its entirety.

TECHNICAL FIELD

Example embodiments generally relate to employment of a system for the operation of power tools and, in particular, relate to such a system that can have components therein automatically updated during operation.

BACKGROUND

Power tools are commonly used across all aspects of industry. Power tools are employed for multiple applications including, for example, drilling, tightening, sanding, and/or the like. Handheld power tools are often preferred, or even required, for jobs that require a high degree of freedom of movement or access to certain difficult to reach objects.

In some contexts, various operations are conducted by humans or machines using power tools as part of a comprehensive assembly process. For example, power tools may be employed to tighten fasteners at various locations along an assembly line for assembling engine parts. These assembly processes may include tightening operations that must be performed in specific orders and/or to specific specifications. Invariably, when humans conduct these operations in a repetitive fashion, some tightening operations may be conducted out of order or to the wrong torque specification.

Accordingly, it may be desirable to provide tool controllers that can be programmed to perform selected operations (e.g., for tightening) according to stored applications the can be executed at the tool controllers. However, updating of these tool controllers and the applications stored therein may become difficult to manage as the need or desire to add or modify applications develops.

BRIEF SUMMARY OF SOME EXAMPLES

Some example embodiments may enable the provision of a tightening parameter server that can be employed in the context described above to manage updates or changes to the applications of tool controllers remotely. Moreover, in some cases, the management of such updates or changes can be accomplished automatically (e.g., via a subscription service).

In an example embodiment, an update manager for a tightening parameter server may be provided. The tightening parameter server may include processing circuitry. The tightening parameter server may be operably coupled to one or more tool controllers that are each operably coupled to respective power tools. The processing circuitry may be configured to receive a subscription request from a tool controller where the subscription request identifies an application to which the tool controller is to be subscribed to receive updates to the application automatically, record an identity of the tool controller in association with the application to build a database of applications and corresponding tool controllers subscribed to each of the applications, determine that a particular application has been updated, and, in response to determining that the particular application has been updated, provide an update to each tool controller subscribed to the particular application.

In another example embodiment, a method of providing automatic updates for tool controllers that are operably coupled to a tightening parameter server is provided. The method may include receiving a subscription request from a tool controller where the subscription request identifies an application to which the tool controller is to be subscribed to receive updates to the application automatically. The method may further include recording an identity of the tool controller in association with the application to build a database of applications and corresponding tool controllers subscribed to each of the applications, determining that a particular application has been updated, and in response to determining that the particular application has been updated, providing an update to each tool controller subscribed to the particular application.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a tightening parameter server that can integrate with operation of highly capable power tools that also have superior characteristics relative to granting access to certain areas and programmability relative to the performance of certain tasks. A power tool may therefore be employable on a moving assembly line such that the operations that are to be executed by the power tool can be executed under the control of a tool controller that is connected to a tightening parameter server of an example embodiment. The tool controller may store a plurality of applications that define various aspects of the operation of the power tool for execution of a specific task. The applications can be updated or modified remotely from the tightening parameter server.

In a typical remote updating scenario, one would expect that the tool controller, when preparing to execute an application, would perhaps check to see if the application has been updated since the last time the application was executed. If an update is detected, the tool controller may request a copy of the update before execution of the application that is to be updated. The update may then be sent and execution of the application may occur only after the update is fully loaded at the tool controller. This would require a series of messages to be exchanged between the tool controller and some central server at which the updated applications are maintained. The time it takes both to exchange the messages and to actually update the application may be experienced as a delay that prevents execution of the application for a period of time and slows down production.

Figure 1:
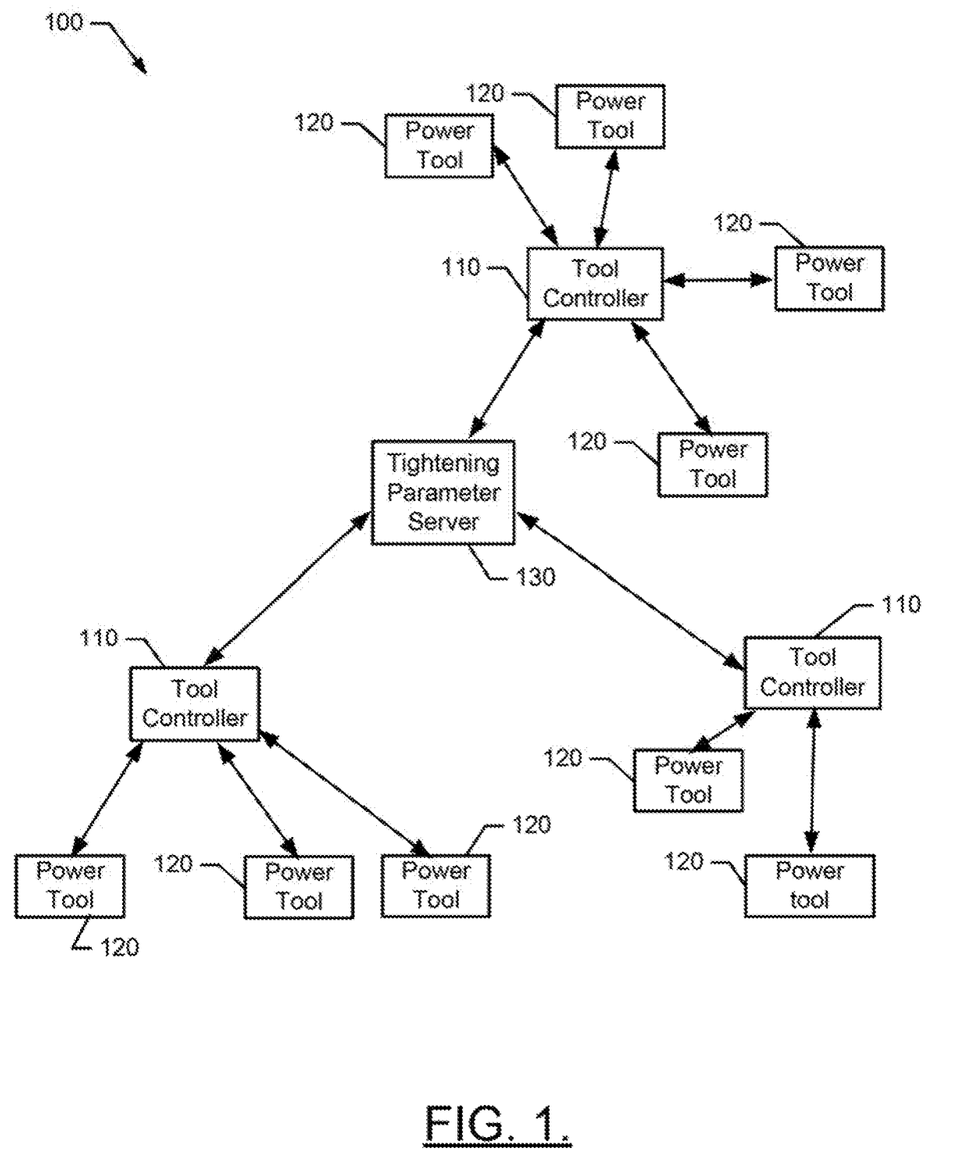
FIG. 1 illustrates a functional block diagram of a system that may be useful in connection with providing a tightening parameter server according to an example embodiment.

However, the updating or modification of tool controllers in an example embodiment can be accomplished without any requirement for the tool controller to check for updates. In this regard, for example, some embodiments may employ an update manager that is configured to retain a list of tool controllers and corresponding applications associated with each tool controller. The update manager may further store subscriptions to applications by respective tool controllers. Accordingly, when an update is received for a particular application, every tool controller that has subscribed to the particular application can be proactively contacted by the update manager to provide the update to the particular application. The update can therefore be provided independent of execution of the particular application so that the next time the particular application is to be executed, the particular application has already been updated and can be executed without delay. Moreover, there will be no need to even check to see if an update is necessary, so messaging associated with checking for updates can also be eliminated. FIG. 1 illustrates a functional block diagram of a system that may be useful in connection with providing a tightening parameter server for updating applications (e.g., tightening applications) for tool controllers and corresponding power tools according to an example embodiment.

As shown in FIG. 1, a system 100 of an example embodiment may include a plurality of tool controllers 110. Each tool controller 110 may be configured to interface with (and enable control of) one or more power tools 120. The power tools 120 may, for example, be respective similar or different instances of a corded (or cordless) hand tool such as a right angle tightening device, or any of a number of other power tools configured for fastening, material removal, assembly, or the like. Thus, for example, the tool controllers 110 may be configured to interface with the power tools 120 to provide instructions or control over operation of the power tools 120 to tighten to specification, enable operation only if the correct order of operations is followed and/or the correct recipient of torque is engaged, and/or the like.

In an example embodiment, the tool controllers 110 may be configured to control the operation of the power tools 120 in accordance with various applications that may be stored at the tool controllers 110. In some cases, a relatively large number of different applications (e.g., 99) may be stored for each power tool 120. The applications may be the same or different for power tools 120 that are associated with a particular instance of the tool controller 110. The applications may be tightening applications that, for example, provide instructions for performance of a tightening operation. In some cases, the tightening applications may define a specific torque (e.g., within a range between high and low limits), a specific angle (e.g., within a range of torques), a specific speed, or various other parameters that may be specific to a given material, location, joint, fastener, or the like. Multiple steps may be defined in some cases The system 100 may further include a tightening parameter server 130, which may be operably coupled to a plurality of tool controllers 110. Communication between the tightening parameter server 130 and the tool controllers 110, and communication between the tool controllers 110 and the power tools 120 may be conducted via wired or wireless communication methods, protocols, or systems. Thus, for example, in some cases, the tool controllers 110 and power tools 120 may be connected to each other via Ethernet. However, in other cases, WiFi or another wireless communication protocol may be employed. In some cases, the tightening parameter server 130 may be "in the cloud" and may be accessible via the Internet.

Regardless of how the components of the system 100 are connected, it should be appreciated that the tightening parameter server 130 may be configured to manage updates to particular tightening applications (or other applications) that are employed by the tool controllers 110 to control operation of the power tools 120. Moreover, the tightening parameter server 130 may be configured to send updates to the tool controllers 110 without prompting or request from the tool controllers 110 by employing a management paradigm that may be considered, for example, as a subscription service. In other words, for example, the tool controllers 110 may subscribe to an updating service for specific applications stored at the tool controllers 110.

Figure 2:
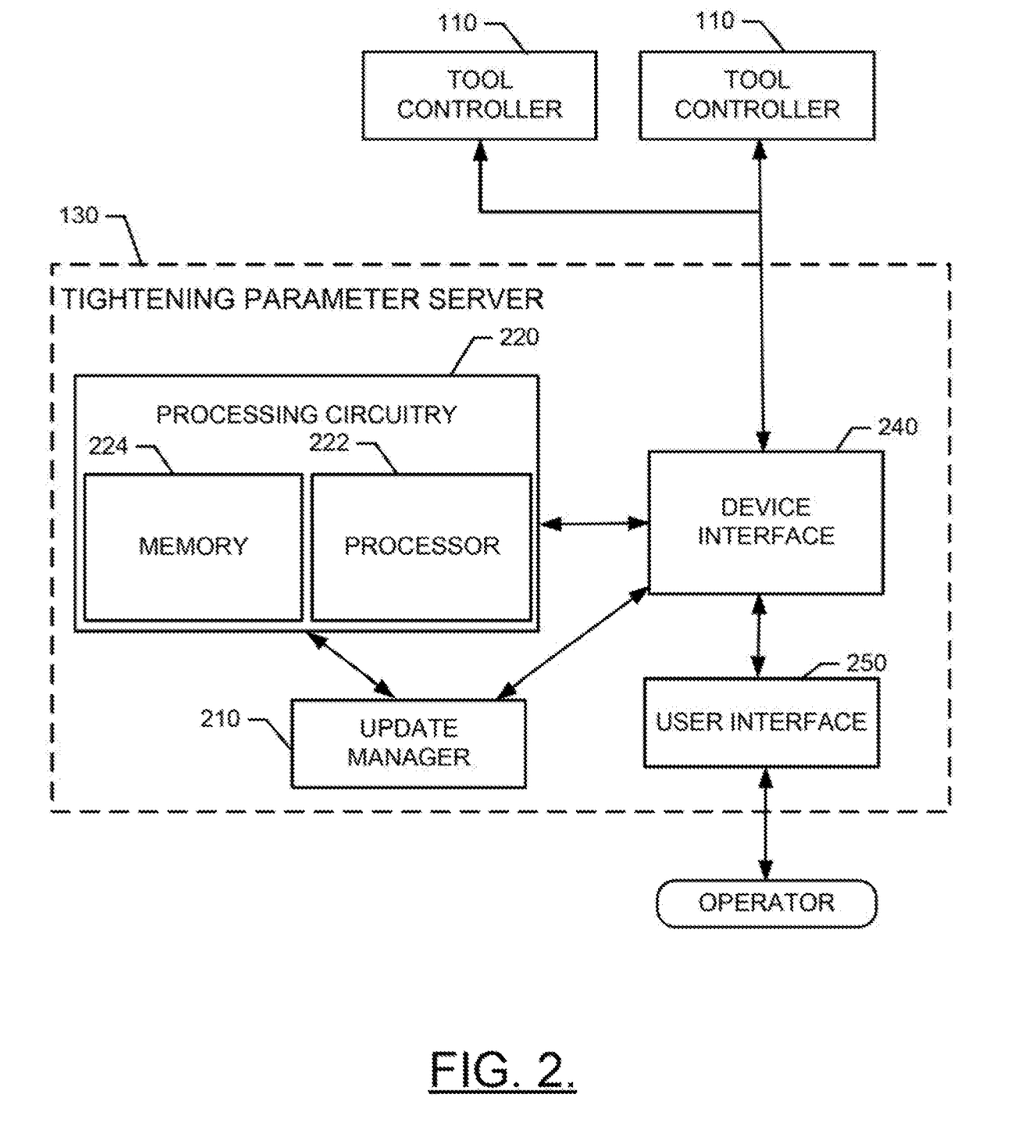
FIG. 2 illustrates a block diagram of the tightening parameter server according to an example embodiment.

FIG. 2 illustrates a block diagram of components or modules that may participate in the subscription service and/or management thereof. In this regard, as shown in FIG. 2, the tightening parameter server 130 may include an update manager 210 that may be configured to manage updating applications at the tool controllers 110 in accordance with an example embodiment. The tightening parameter server 130 may also include or otherwise be in communication with the processing circuitry 220 that is configurable to perform actions in accordance with example embodiments described herein. As such, for example, at least some of the functions attributable to the tightening parameter server 130 and/or the update manager 210 may be carried out by or otherwise instructed by the processing circuitry 220. The processing circuitry 220 may provide the hardware that is programmed or that hosts software to configure the system for enabling updates (or new applications) to be generated, and then for the updates to be shared with subscribed tool controllers consistent with example embodiments. In this regard, both the generation of the updates themselves, and the subsequent tracking of applications associated with tool controllers, the versions presently configured to each tool controller, and the updating of those versions as appropriate may therefore be accomplished using the processing circuitry 220.

The processing circuitry 220 may be configured to perform data processing, control function execution and/or other processing and management services according to an example embodiment of the present invention. In some embodiments, the processing circuitry 220 may be embodied as a chip or chip set. In other words, the processing circuitry 220 may comprise one or more physical packages (e.g., chips) including materials, components and/or wires on a structural assembly (e.g., a baseboard).

In an example embodiment, the processing circuitry 220 may include one or more instances of a processor 222 and memory 224 that may be in communication with or otherwise control a device interface 240 and, in some cases, a user interface 250. As such, the processing circuitry 220 may be embodied as a circuit chip (e.g., an integrated circuit chip) configured (e.g., with hardware, software or a combination of hardware and software) to perform operations described herein.

The user interface 250 (if implemented) may be in communication with the processing circuitry 220 (directly or via the device interface 240) to receive an indication of a user input at the user interface 250 and/or to provide an audible, visual, mechanical or other output to the user. As such, the user interface 250 may include, for example, a display, one or more buttons or keys (e.g., function buttons), and/or other input/output mechanisms (e.g., keyboard, microphone, speakers, cursor, joystick, lights and/or the like). The user interface 250 may display or otherwise provide an output of information enabling an operator to define new applications or update existing applications. The user interface 250 may also be configured to display one or more control consoles for setting up the management of update provisioning to tool controllers 110 or to view the status of activities or other information associated with update provisioning as described herein.

In an example embodiment, the user interface 250 may provide information to the user to indicate an identity of applications, tool controllers, operators, and/or versioning information to enable the definition of applications or updating of applications (e.g., in terms of process order, angle, torque, and/or the like), provision of feedback regarding execution of applications or updating of applications, etc. As such, for example, the user interface 250 may provide a mechanism by which the operator can interface with the tightening parameter server 130, and specifically the update manager 210, to manage operation of the tightening parameter server 130 (or update manager 210) relative to the operations described herein. In some cases, the user interface 250 may include options for selection of one or more menu items associated with development of new applications (e.g., for interface with an application development module or tool) reports to be generated based on the analysis of a given data set. Thus, the user interface 250 may interface with or include an application development module that, once such applications have been defined, may be configured to enable the update manager 210 to thereafter handle updating of delivery of the applications to various tool controllers 110 as described herein.

The device interface 240 may include one or more interface mechanisms for enabling communication with the various internal and/or external devices of the system 100. Thus, for example, the device interface 240 may handle routing of communications within the tightening parameter server 130 and/or between the tightening parameter server 130 (and update manager 210) and various other devices (e.g., tool controllers 110) within the system 100. In some cases, the device interface 240 may be any means such as a device or circuitry embodied in either hardware, or a combination of hardware and software that is configured to receive and/or transmit data from/to devices in communication with the processing circuitry 220. In some cases, the device interface 240 may include one or more ports for external component connectivity and/or communication (e.g., Ethernet or wireless communications, and/or the like). Standard ports such as USB, other data ports, or power cable ports may be provided. However, in some cases, the ports may be for proprietary connectivity mechanisms. In some embodiments, the device interface 240 may include antennas, radio equipment and/or the like to enable the tightening parameter server 130 to interface with other components or devices wirelessly. Otherwise, wired communication, or combinations of wired and wireless communication, may be employed.

In an exemplary embodiment, the memory 224 may include one or more non-transitory memory devices such as, for example, volatile and/or non-volatile memory that may be either fixed or removable. The memory 224 may be configured to store information, data, applications, instructions or the like for enabling the tightening parameter server 130 to carry out various functions in accordance with exemplary embodiments of the present invention. For example, the memory 224 could be configured to buffer input data for processing by the processor 222. Additionally or alternatively, the memory 224 could be configured to store instructions for execution by the processor 222. As yet another alternative, the memory 224 may include one or more databases that may store a variety of data sets indicative of the performance or parameters of various power tools 120 and/or tool controllers 110. Thus, in some cases, the memory 224 may store information associated with patterns, image data, feature vectors, histograms, processing algorithms and/or the like to be employed for inclusion in or the definition of tightening applications associated with the execution of example embodiments. Among the contents of the memory 224, applications (e.g., tightening applications) may be stored for execution by the tool controllers 110 in order to carry out the functionality associated with each respective application. In some cases, the applications may include directions for control of the power tools 120 to tighten a particular bolt or other fixing device including specific operator instructions, tightening parameters, orders of operations, etc., as described herein. Other applications stored in the memory 224 may facilitate the generation of updates to the tightening applications, and still other applications stored in the memory 224 may facilitate management of updating of the tightening applications. Thus, for example, the memory 224 may also store applications that include directions for enabling authorized personnel to make updates to tightening applications and managing subscriptions to the updates along with provision of the updates as part of managing the subscriptions as described herein.

The processor 222 may be embodied in a number of different ways. For example, the processor 222 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 222 may be configured to execute instructions stored in the memory 224 or otherwise accessible to the processor 222. As such, whether configured by hardware or by a combination of hardware and software, the processor 222 may represent an entity (e.g., physically embodied in circuitry—in the form of processing circuitry 220) capable of performing operations according to embodiments of the present invention while configured accordingly. Thus, for example, when the processor 222 is embodied as an ASIC, FPGA or the like, the processor 222 may be specifically configured hardware for conducting the operations described herein. Alternatively, as another example, when the processor 222 is embodied as an executor of software instructions, the instructions may specifically configure the processor 222 to perform the operations described herein.

In an example embodiment, the processor 222 (or the processing circuitry 220) may be embodied as, include or otherwise control the tightening parameter server 130 (or components thereof—such as the update manager 210). As such, in some embodiments, the processor 222 (or the processing circuitry 220) may be said to cause each of the operations described in connection with the tightening parameter server 130 (or components thereof—such as the update manager 210) by directing the tightening parameter server 130 (or respective components) to undertake the corresponding functionalities responsive to execution of instructions or algorithms configuring the processor 222 (or processing circuitry 220) accordingly.

In an example embodiment, the update manager 210 may therefore be any means such as a device or circuitry embodied in either hardware, or a combination of hardware and software that is configured to perform the corresponding functions of the update manager 210 as described herein under the control of the processing circuitry 220. In an example embodiment, the update manager 210 may be configured to perform various actions associated with management and distribution of tightening applications based at least in part on a subscription service paradigm. In particular, the update manager 210 may be configured to track versions of applications and, in response to a version update for a particular one of the applications, the update manager 210 may manage distribution of the version update to every tool controller (or power tool) that is a subscriber for the corresponding application that has been updated. One example of how the update manager 210 may work will now be described in reference to FIG. 3, which illustrates a control console 300 that may be presented (e.g., via the user interface 250) to an operator to facilitate activities in association with the subscription service paradigm.

Figure 3:
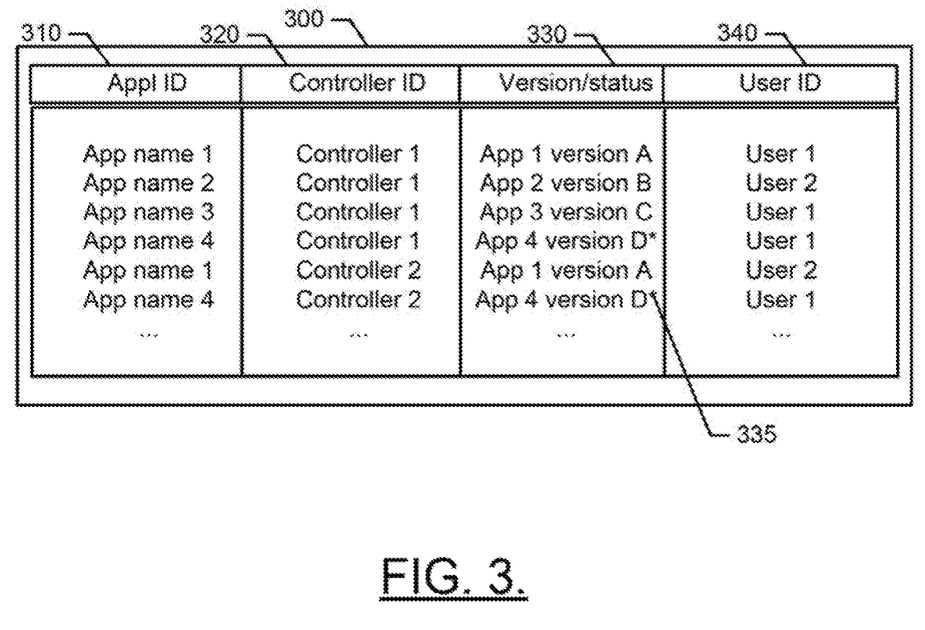
FIG. 3 illustrates a control console that may be provided for interaction by an operator using the tightening parameter server in accordance with an example embodiment.

As shown in FIG. 3, the control console 300 may include a number of columns and rows of information associated with various tightening applications that have had subscriptions submitted for them by tool controllers 110. For example, an application identifier (ID) may be provided for each application managed by the update manager 210 by virtue of a tool controller 110 submitting a subscription or subscription request for the corresponding application ID. In this example, a list of application IDs (e.g., application names) may be provided in a column of application IDs 310. Another list may be provided for controller IDs that identify specific tool controllers that have requested subscriptions for applications. The controller IDs may be provided in a controller ID column 320 in one-to-one correlation (by row) with the application IDs that are either stored at or subscribed to a corresponding one of the tool controllers 110. For each application ID, the corresponding row may also identify the latest version for the corresponding application ID. In some cases, a status indicator (e.g., an update flag 335 indicating that the application has recently been updated) may also be provided for applicable ones of the application IDs. Thus, a version/status identifier may be provided in a separate column (i.e., a version/status column 330) of the control console 300. Additionally, in some cases, a user ID for the last person to update a given application may also be provided in a separate column (i.e., a user ID column 340) of the control console 300. Other columns may also be provided for other information (e.g., date of last change or update, tool controller location, comments, etc.). Moreover, in some cases, the revision number may be its own column and the status may be a separate column. In such an example, various different statuses (other than merely showing an updated status) may be included. For example, retired, released, updated, in development, or other status identifiers could be included.

In the example of FIG. 3, the columns may list the application IDs for each tool controller separately. Thus, for example, if two tool controllers (e.g., controller 1 and controller 2) each have at least one application in common, then the corresponding application may be listed twice (once for each tool controller) in the application ID column. App name 1 and app name 4 are examples of this phenomena in that both applications are stored at each of controller 1 and controller 2. Within this context, application IDs may be repeated as many times as they are stored at respective different controllers. However, it may alternatively be possible to list application IDs only once and, for example, list all of the controller IDs that store each application ID so that, for example, app name 1 would be listed one time, and in a controller ID column for app name 1, a list of every controller ID that stores app name 1 may be included. Regardless of the way in which the control console 300 is constructed, tightening applications can be correlated to their respective controllers, and a latest version for each respective application may also be recorded (perhaps also with the identity of the person who made the last version update).

In response to a particular authorized user making a version update to a particular application, the updated status of the particular application may be noted (e.g., by the update flag 335). The update manager 210 may be configured to enable the update flag 335 to be cleared by pushing the update to every tool controller 110 that stores the particular application. Thus, in the example of FIG. 3, the app name 4 application has been updated by user 1 to version D. This app name 4 application is therefore modified to show the latest version (i.e., version D), but also has the update flag 335 associated therewith. The update manager 210 may be configured to then push the version D update to controller 1 and controller 2 (along with any other controllers that have subscribed to the app name 4 application) to clear the update flag 335.

In some cases, the update manager 210 may have other methods (besides the update flag 335) to recognize when an update has occurred and correspondingly when a revision needs to be provided to the tool controllers 110 that have the corresponding application. For example, the update manager 210 could alternatively have a column or otherwise note the version stored at the tool controller 110 and also have a column or otherwise note the latest version. In this example, the update manager 210 may compare the version stored at the tool controller 110 to the latest version and, when there is a mismatch, the update manager 210 may be configured to resolve the mismatch by providing the latest version to the tool controller 110. This may be accomplished for every one of the tool controllers 110 that stored the corresponding application. Still other updating strategies may be accomplished in other cases. However, for example, the update manager 210 may generally be configured to determine when there is an update that needs to be provided to the tool controllers 110 on continuous, periodic, or event driven basis, and then provide the update to the respective tool controllers 110. The provision of the update may also be made by the update manager 210 on a continuous, periodic or event driven basis. In other words, provision of the update may be continuously be tried until accomplished, may be attempted at predefined intervals (e.g., hourly, daily, weekly, etc.), or may be attempted in response to a particular event (e.g., notice of the update, shutdown or an off cycle for the tool controller 110 or power tool 120, end of a work day, start of a work day, scheduled update time, etc.).

The tightening parameter server 130 may allow the operator to coordinate all tightening strategies within one database, while monitoring all tool performance from a single user interface. Moreover, the tightening parameter server 130 may enable real time, or near real time, change management to be implemented so that all changes can be monitored and approved based on organizational hierarchy. For example, only authorized users may be enabled to make changes or update applications. Moreover, in some cases, an approval authority may be required before the changes or updates can be released, and release may only be permitted after sufficient testing has been verified. Thereafter, monitoring may also be employed for measuring product performance and for the back-up or restoration of certain capabilities. For example, manual and automatic parameter distribution may be logged and automatic distribution of released parameter changes may be handled with subscriptions (i.e., without polling).

From the screen shown in FIG. 3, the operator may select a particular application to be pulled from a controller in order to review or revise the application. Alternatively or additionally, the operator may push selected applications to a controller. The operator may also be enabled to release applications (i.e., change the status of the application to released) or retire applications to prevent future use of the application in the production environment. Other controllers and/or applications may also be added by the operator, and data regarding controllers and/or applications may be edited. Communication channels may be added or edited and other administrative functions may also be performed. For example, remote diagnostics may be managed from a home screen provided by the tightening parameter server 130.

Figure 4:
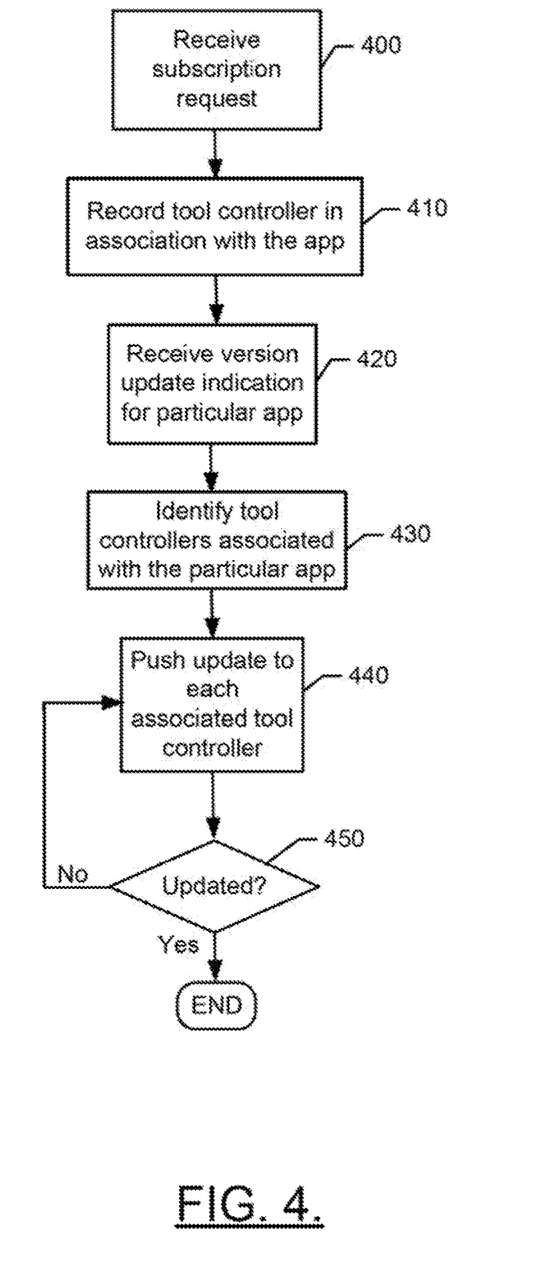
FIG. 4 illustrates a block diagram of a method of updating applications using the tightening parameter server in accordance with an example embodiment.

FIG. 4 illustrates a block diagram of a method of updating a tightening application in accordance with an example embodiment. In particular, FIG. 4 may illustrate the method as it is executed from the perspective of the update manager 210 in accordance with an example embodiment. In this regard, at operation 400, the update manager 210 may receive a subscription request from a tool controller. The subscription request may identify an application (e.g., a tightening application) to which the tool controller wishes to subscribe to receive updates automatically. The tool controller may have an interface for requesting addition to a subscription list or, in some cases, every application stored at the tool controller may be considered to be subscribed. Thus, a request or an application could be seen as a request for a subscription. In still other cases, new applications may be pushed (e.g., by the operator) to the tool controllers 110 of FIG. 1 along with corresponding subscriptions for the applications. Regardless of how the request is made, the update manager 210 may then record the tool controller in association with the application at operation 410. As a result of repeated execution of operations 400 and 410, the update manager 210 may build a database of applications and corresponding tool controllers that have subscribed to receive updates for the respective applications.

Operating off of this database, at operation 420, a version update indication may be received for a particular application. At operation 430, the update manager 210 may be configured to identify all tool controllers that are associated with the particular application (e.g., tool controllers that store the particular application and/or have submitted a subscription request for the particular application). An update may then be pushed to each associated tool controller (i.e., each subscriber for the particular application) at operation 440. At operation 450, a check of the status of the update attempt may be made to confirm whether the update was received and stored at the corresponding tool controller. If the update was not successfully made or received, than another attempt to push the update may be made by repeating operation 440. However, if the update was made successfully, then the method may end until either another subscription request is received or an update indication is received. Thus, the possible two entry points into the method (assuming operations 400 and 410 have been previously performed at least once) are at operations 400 and 420.

In some cases, the method may be augmented or modified by altering individual operations or adding operations. The augmentations or modifications may be performed in any combination and in any order. For example, in some cases, the method may be modifies such that determining that the particular application has been updated includes continuously monitoring an update status of the applications in the database to determine that the particular application has been updated in real time (or substantially in real time). Thus, for example, continuous comparisons of application versions may be compared to determine when an update has occurred. Alternatively or additionally, determining that the particular application has been updated may include periodically monitoring an update status of the applications in the database to determine that the particular application has been updated since a prior monitoring event. The periodic monitoring may be at predefined intervals. Alternatively or additionally, determining that the particular application has been updated may include monitoring an update status of the applications in the database to determine that the particular application has been updated in response to a trigger event. The trigger event may be any detectable and/or predefined event that, when detected, triggers the corresponding determination to be made (or checked). In some embodiments, providing the update may include providing the update in real time (or substantially in real time) in response to determining that the particular application has been updated. Alternatively or additionally, providing the update may include providing the update at one or a plurality of predefined update intervals in response to determining that the particular application has been updated. Alternatively or additionally, providing the update may include providing the update in response to a trigger event (e.g., scheduling provision of the update at a future time corresponding to the trigger event). The various options above for determining when an update has occurred and actually providing the update to the tool controllers can be performed in any combination.

Figure 5:
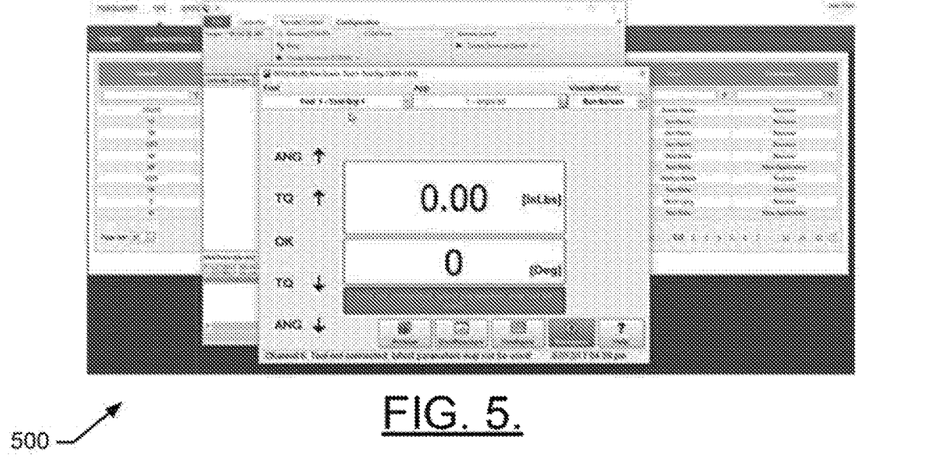
FIG. 5 illustrates a parameter entry screen in accordance with an example embodiment.
Figure 6:
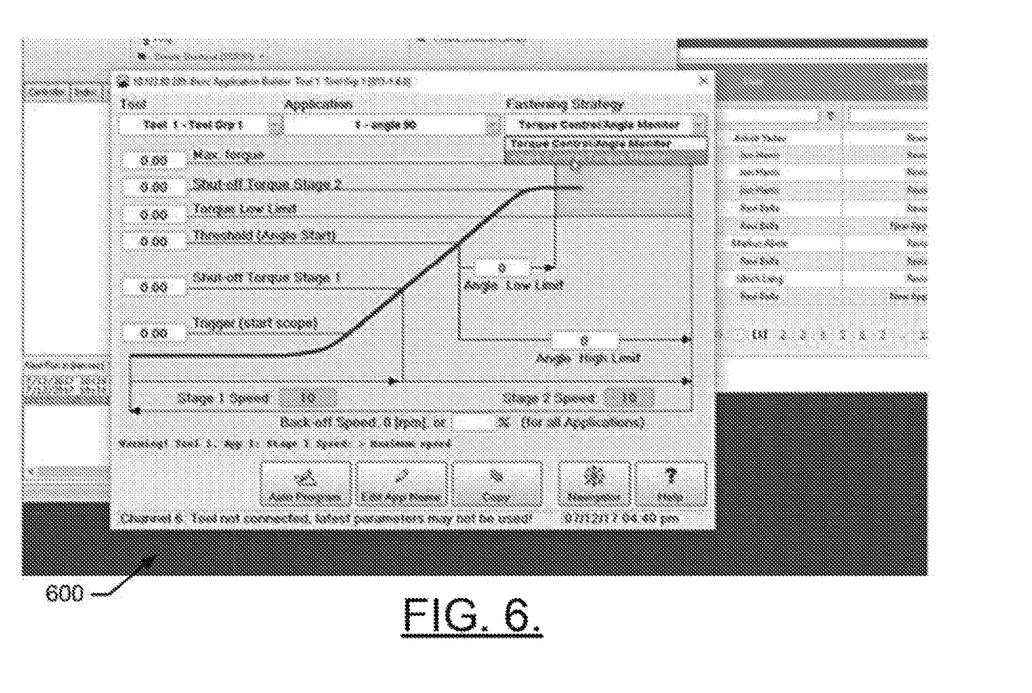
FIG. 6 illustrates an application definition screen in accordance with an example embodiment.
Figure 7:
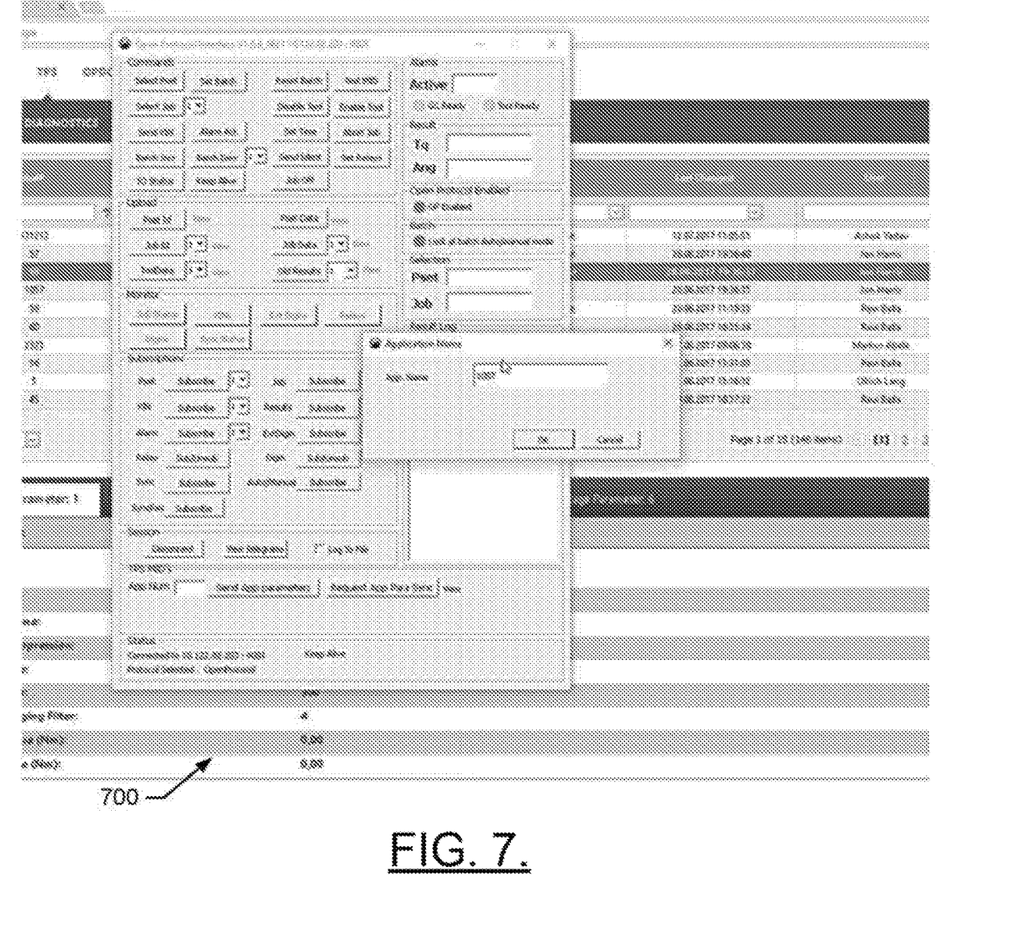
FIG. 7 illustrates an application naming console in accordance with an example embodiment.

As discussed above, the user interface 250 may be used to modify or define tightening applications via a series of menus or control consoles. FIGS. 5-7 illustrate some examples of screens or control consoles that may be encountered by an operator in connection with modifying or defining tightening applications in accordance with an example embodiment. In this regard, FIG. 5 illustrates a parameter entry screen 500 in accordance with an example embodiment. FIG. 6 illustrates an application definition screen 600 in accordance with an example embodiment. FIG. 7 illustrates an application naming console 700 in accordance with an example embodiment.

As can be appreciated from the depictions in FIGS. 5-7, the parameters that are used to define a particular application may be entered along with a fastening strategy and any other suitable information via a series of screens and/or menus. The operator may select, for example, one of the application IDs from the control console 300 of FIG. 3 in order to interface with the corresponding application. If the operator is authorized to make changes, the operator may select desired menu options or input desired parameters to make a change to the tightening application. The operator may then save the application when all changes have been completed. In some cases, the operator may be asked whether the application (as modified) is to be considered a new application, or an updated version of the existing application (i.e., the application selected from the control console 300 in the first place). When the operator indicates or it is otherwise determined that the application is a new version, the new version of the application may be pushed to all subscribed tool controllers according to the defined method for distributing updates.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system comprising:
one or more tool controllers;
a plurality of power tools operably coupled to respective ones of the tool controllers to operate under the control of the tool controllers to execute applications stored at the tool controllers; and
a tightening parameter server operably coupled to the tool controllers,
wherein tightening parameter server comprises processing circuitry configured to:
receive a subscription request from a tool controller, the subscription request identifying an application to which the tool controller is to be subscribed to receive updates to the application automatically,
record an identity of the tool controller in association with the application to build a database of applications and corresponding tool controllers subscribed to each of the applications,
determine that a particular application has been updated by monitoring an update status of the applications in the database to determine that the particular application has been updated (i) continuously in real time, (ii) periodically, or (iii) in response to a triggering event, the particular application being a tightening application indicating a specific torque, and
in response to determining that the particular application has been updated as indicated by the update status for the particular application in the database, provide an update to each tool controller subscribed to the particular application.

2. The system of claim 1, wherein determining that the particular application has been updated comprises continuously monitoring an update status of the applications in the database to determine that the particular application has been updated in real time.

3. The system of claim 1, wherein determining that the particular application has been updated comprises periodically monitoring an update status of the applications in the database to determine that the particular application has been updated since a prior monitoring event.

4. The system of claim 1, wherein determining that the particular application has been updated comprises monitoring an update status of the applications in the database to determine that the particular application has been updated in response to a trigger event.

5. The system of claim 1, wherein providing the update comprises providing the update in real time in response to determining that the particular application has been updated.

6. The system of claim 1, wherein providing the update comprises providing the update at one or a plurality of predefined update intervals in response to determining that the particular application has been updated.

7. The system of claim 1, wherein providing the update comprises providing the update in response to a trigger event.

8. The system of claim 7, wherein providing the update comprises scheduling provision of the update at a future time corresponding to the trigger event.

9. A method of providing automatic updates for tool controllers that are operably coupled to a tightening parameter server, the method comprising:
receiving a subscription request from a tool controller, the subscription request identifying an application to which the tool controller is to be subscribed to receive updates to the application automatically;
recording an identity of the tool controller in association with the application to build a database of applications and corresponding tool controllers subscribed to each of the applications;
determining that a particular application has been updated by monitoring an update status of the applications in the database to determine that the particular application has been updated (i) continuously in real time, (ii) periodically, or (iii) in response to a triggering event, the particular application being a tightening application indicating a specific torque; and
in response to determining that the particular application has been updated as indicated by the update status for the particular application in the database, providing an update to each tool controller subscribed to the particular application.

10. The method of claim 9, wherein determining that the particular application has been updated comprises continuously monitoring an update status of the applications in the database to determine that the particular application has been updated in real time.

11. The method of claim 9, wherein determining that the particular application has been updated comprises periodically monitoring an update status of the applications in the database to determine that the particular application has been updated since a prior monitoring event.

12. The method of claim 9, wherein determining that the particular application has been updated comprises monitoring an update status of the applications in the database to determine that the particular application has been updated in response to a trigger event.

13. The method of claim 9, wherein providing the update comprises providing the update in real time in response to determining that the particular application has been updated.

14. The method of claim 9, wherein providing the update comprises providing the update at one or a plurality of predefined update intervals in response to determining that the particular application has been updated.

15. The method of claim 9, wherein providing the update comprises providing the update in response to a trigger event.

16. The method of claim 15, wherein the providing the update comprises scheduling provision of the update at a future time corresponding to the trigger event.

17. An update manager for a tightening parameter server, the tightening parameter server being operably coupled to one or more tool controllers that are each operably coupled to respective power tools, the update manager comprising processing circuitry configured to:
  receive a subscription request from a tool controller, the subscription request identifying an application to which the tool controller is to be subscribed to receive updates to the application automatically;
  record an identity of the tool controller in association with the application to build a database of applications and corresponding tool controller subscribed to each of the applications;
  determine that a particular application has been updated by monitoring an update status of the applications in the database to determine that the particular application has been updated (i) continuously in real time, (ii) periodically, or (iii) in response to a triggering event, the particular application being a tightening application indicating a specific torque; and
  in response to determining that the particular application has been updated as indicated by the update status for the particular application in the database, provide an update to each tool controller subscribed to the particular application.

18. The update manager of claim 17, wherein determining that the particular application has been updated comprises continuously monitoring an update status of the applications in the database to determine that the particular application has been updated in real time.

19. The update manager of claim 17, wherein determining that the particular application has been updated comprises periodically monitoring an update status of the applications in the database to determine that the particular application has been updated since a prior monitoring event.

20. The update manager of claim 17, wherein determining that the particular application has been updated comprises monitoring an update status of the applications in the database to determine that the particular application has been updated in response to a trigger event.

21. The update manager of claim 17, wherein providing the update comprises providing the update in real time in response to determining that the particular application has been updated.

22. The update manager of claim 17, wherein providing the update comprises providing the update at one or a plurality of predefined update intervals in response to determining that the particular application has been updated.

23. The update manager of claim 17, wherein providing the update comprises providing the update in response to a trigger event.

24. The update manager of claim 23, wherein the providing the update comprises scheduling provision of the update at a future time corresponding to the trigger event.

* * * * *